United States Patent
Bernhardt et al.

(10) Patent No.: US 7,367,743 B2
(45) Date of Patent: May 6, 2008

(54) BALL JOINT AND A COMPONENT WITH BALL JOINT

(75) Inventors: Peter Bernhardt, Wuppertal (DE); Theo Heep, Krefeld (DE); Ulrich Mette, Essen (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 11/341,903

(22) Filed: Jan. 27, 2006

(65) Prior Publication Data

US 2006/0153632 A1    Jul. 13, 2006

Related U.S. Application Data

(63) Continuation of application No. PCT/EP2004/008450, filed on Jul. 28, 2004.

(30) Foreign Application Priority Data

Jul. 28, 2003   (DE)  ........................... 203 11 595 U

(51) Int. Cl.
  *F16C 11/06*   (2006.01)
  *F16J 15/52*   (2006.01)
(52) U.S. Cl. ........................ 403/122; 403/50
(58) Field of Classification Search ............... 403/121, 403/122, 50, 51, 134, 135
See application file for complete search history.

(56) References Cited

U.S. PATENT DOCUMENTS

| | | | | |
|---|---|---|---|---|
| 2,976,068 A | * | 3/1961 | Jordan | 403/51 |
| 3,001,007 A | * | 9/1961 | Klumpp, Jr. et al. | 174/153 G |
| 3,216,754 A | * | 11/1965 | Smith et al. | 403/51 |
| 3,861,812 A | * | 1/1975 | Ito | 403/71 |
| 4,954,006 A | * | 9/1990 | Suzuki et al. | 403/135 |
| 5,092,703 A | * | 3/1992 | Kobayashi | 403/122 |
| 5,152,628 A | | 10/1992 | Broszat et al. | |
| 5,489,161 A | * | 2/1996 | Sugita et al. | 403/134 |
| 5,601,378 A | * | 2/1997 | Fukukawa et al. | 403/140 |
| 5,611,635 A | * | 3/1997 | Schutt et al. | 403/141 |
| 5,653,545 A | * | 8/1997 | Moormann et al. | 403/50 |
| 5,782,573 A | * | 7/1998 | Dorr et al. | 403/135 |
| 5,931,597 A | | 8/1999 | Urbach | |
| 6,102,604 A | * | 8/2000 | Maughan | 403/134 |
| 6,254,114 B1 | | 7/2001 | Pulling et al. | |
| 6,398,446 B1 | * | 6/2002 | Pazdirek et al. | 403/134 |
| 6,530,711 B2 | * | 3/2003 | Menotti | 403/135 |

FOREIGN PATENT DOCUMENTS

| | | |
|---|---|---|
| DE | 197 13 337 A1 | 10/1998 |
| DE | 198 47 842 A1 | 5/1999 |
| EP | 0 546 609 | 6/1993 |
| JP | 06156032 | 6/1994 |

\* cited by examiner

*Primary Examiner*—Daniel P. Stodola
*Assistant Examiner*—Joshua T Kennedy
(74) *Attorney, Agent, or Firm*—MacMillan, Sobanski & Todd, LLC

(57) ABSTRACT

A ball joint with a housing wherein the housing has a weld section, which allows it to be welded to a chassis component.

12 Claims, 2 Drawing Sheets

BALL JOINT AND A COMPONENT WITH BALL JOINT

CROSS-REFERENCE TO RELATED APPLICATIONS

This application is a continuation of International Application No. PCT/EP2004/008450 filed Jul. 28, 2004, the disclosures of which are incorporated herein by reference in entirety, and which claimed priority to German Patent Application No. 203 11 595.3 filed Jul. 28, 2003, the disclosures of which are incorporated herein by reference in entirety.

BACKGROUND OF THE INVENTION

The invention relates to a ball joint, as can be used in particular in the chassis of motor vehicles. The invention also relates to a component, in particular a chassis steering arrangement, with such a ball joint.

To fasten the ball joint to a component such as a chassis steering arrangement, it is known to press the housing of the ball joint into an opening in the chassis steering arrangement. A disadvantage here is the comparatively high expenditure. A disadvantage in addition is that through the pressing of the housing into the opening, the friction moments of the ball joint can increase.

BRIEF SUMMARY OF THE INVENTION

The present invention consists in further developing a ball joint of the type initially mentioned to the effect that it can be fastened to a component with less expenditure.

For this purpose, provision is made according to the invention that the housing of the ball joint has a weld section, by means of which it can be welded to a component. To solve this problem, a component is also provided, in particular a chassis steering arrangement, with a ball joint, the housing being inserted into an opening of the component and the weld section of the housing being welded with the component. The advantage of this solution consists in that lower costs result compared with a pressed-in ball joint. A further advantage consists in that higher pressing-in and pressing-out forces are produced than in pressed in joints. In addition, the function of the joint is not altered by the welding, in particular no higher joint friction moments are produced, as can occur in press-in joints. Finally, the advantage is produced that a smaller structural space is achieved.

According to a preferred embodiment of the invention, a sealing bellows is provided on the ball joint, which has a clamping section, the clamping section being securely clamped to the housing, in particular between the housing and the edge of the opening of the component. In this way, an otherwise usual clamping ring can be dispensed with, which is provided to securely clamp the sealing bellows to the housing, for example in a groove which is additionally turned for this purpose.

Other advantages of this invention will become apparent to those skilled in the art from the following detailed description of the invention, when read in light of the accompanying drawings.

DETAILED DESCRIPTION OF THE INVENTION

Figure 1:
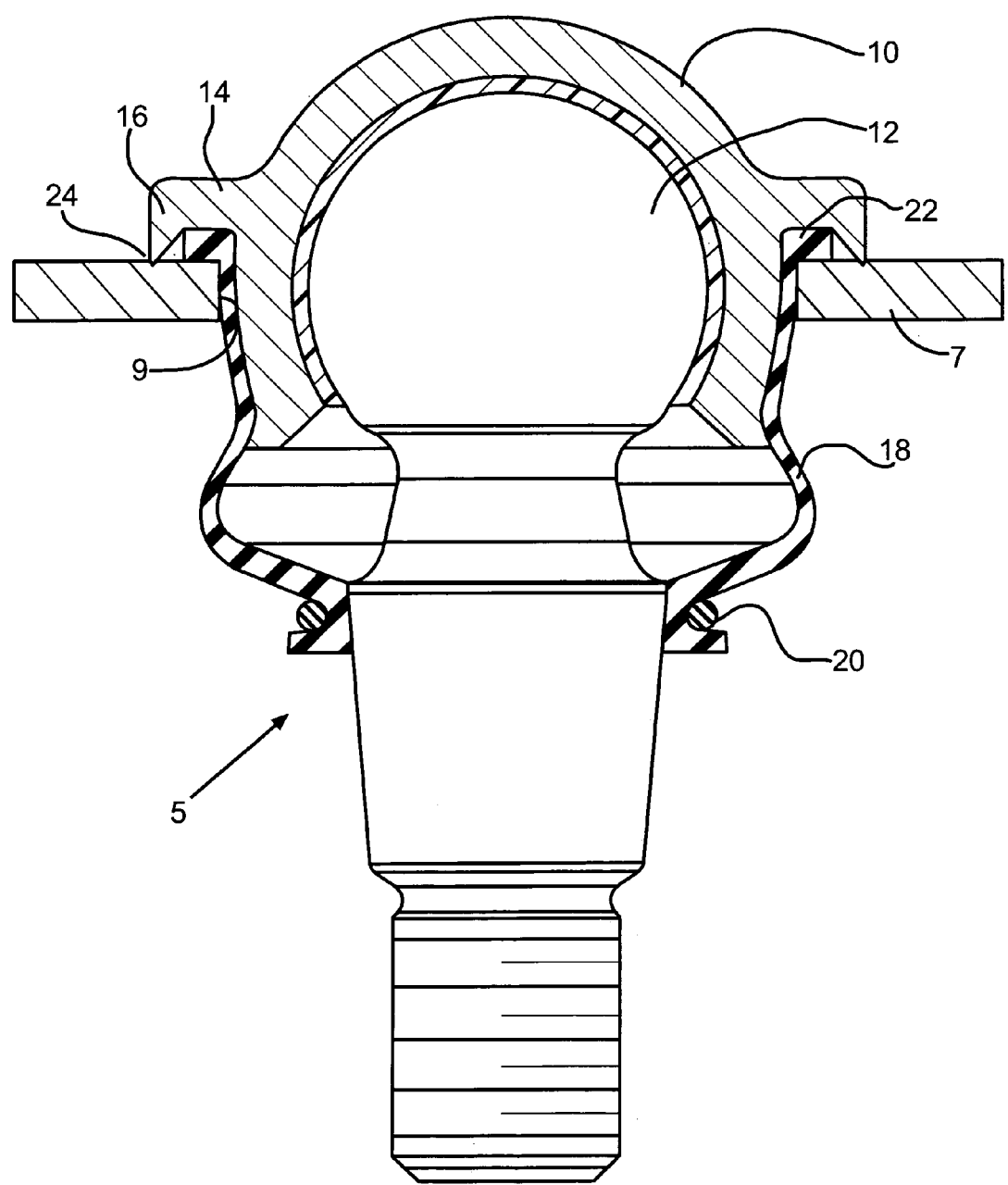
FIG. 1 shows a cross-section through a ball joint arranged in a component according to a first embodiment of the invention.

In FIG. 1 a ball joint 5 is shown, which is inserted into a component 7. For this purpose, the component 7 is provided with an opening 9, the diameter of which is greater than the external diameter of the housing 10. The component may, for example, be a chassis steering arrangement of a motor vehicle.

The ball joint 5 has a housing 10, which is produced in one piece and without reworking by cutting, namely by extrusion moulding. Inside the housing, in a known manner a ball stud 12 is arranged, which is swivellable about a structurally given angle relative to the housing 10.

The housing 10 is provided with a weld section 14, which is constructed here as an encircling flange. At its radially exterior end, the weld section 14 is provided with an encircling, conically tapering edge section 16. This edge section is provided for fastening the ball joint 5 to the component 7.

A sealing bellows 18, which is arranged closely against the ball stud 12 by a clamping ring 20, seals between the ball stud 12 and the housing 10 of the ball joint. On the side of the housing, the sealing bellows 18 is provided with a clamping section 22, which is constructed as an encircling flange projecting at right-angles. This flange rests on the weld section 14, and namely in the space which is surrounded by the encircling edge section 16 of the weld section 14.

To arrange the ball joint 5 on the component 7, the housing is inserted by the ball stud through the opening 9 in the component 7 so that the conical edge section 16 of the housing 10 of the ball joint rests on the upper side of the component 7. Here, the clamping section 22 of the sealing bellows 18 is compressed between edge section of the component surrounding the opening 9 of the component 7, the weld section 14 and in axial direction the wall of the housing 10, so that it is held there reliably without other measures. To connect the weld section 14 with the component 7, in particular a condenser discharge welding process or a resistance welding process is suitable, in which a high current flows briefly between the housing 10 of the ball joint 5 and the component 7. Here, the material of the weld section 14 and of the component 7 warms up locally in the region of their contact point, so that the materials fuse with each other. Therefore, a ring-shaped encircling zone 24 is formed, in which the edge section 16 of the weld section 14 of the housing 10 is connected with the component 7 by common material. In the welding process, so little heat is released that the sealing bellows 18 is not impaired, in particular in the region of the clamping section 24.

Figure 2:
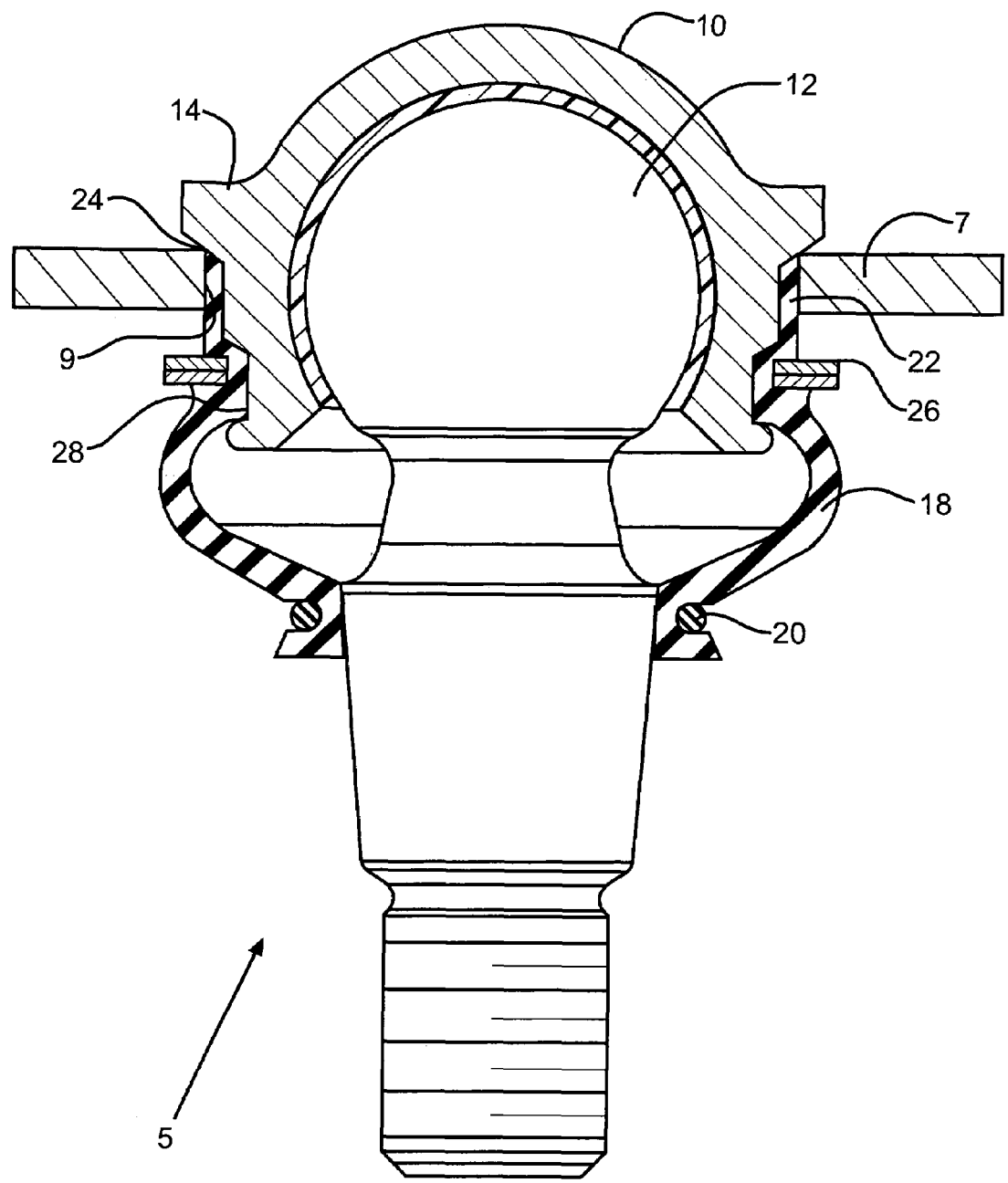
FIG. 2 shows in a cross-section a ball joint arranged in a component according to a second embodiment of the invention.

In FIG. 2 a second embodiment of a ball joint is shown. The same reference numbers are used for the components known from the first embodiment, and reference is to be made to the above descriptions.

The first difference between the first and the second embodiment consists in that the weld section 14 in the second embodiment is constructed so as to be chamfered on one side, and namely with the side which is provided to lie against the edge of the opening 9 in the component 7. The second difference consists in that the clamping section 22 of the sealing bellows 18 is constructed without a flange, but extends in the manner of a cylindrical bush into the gap between the component 7 and the housing 10 and lies against the chamfered surface of the weld section 14.

On assembly, the housing 10 with the sealing bellows 18 is pushed into the opening 9 in the component 7, until the weld section 14 lies against the edge of the opening 9 of the component 7. As the weld section 14 is chamfered, a circular line contact is produced here. The clamping section 22 of the sealing bellows 18 is clamped here with a certain prestressing between the housing and the component 7. To improve the hold of the sealing bellows 18 on the housing 10, a clamping ring 26 is provided, which presses the sealing bellows into a groove 28 on the housing 10 and secures it there.

For welding the housing 10 with the component 7, a condenser discharge welding process is also particularly suited. The currents flowing here between the component 7 and the housing 10 bring about a connection by common material in the encircling zone 24 between the housing 10 and the component 7.

As in both embodiments the housing 10 is produced without working by cutting, namely by extrusion moulding, low production costs are the result. As, moreover, in the first embodiment, additional securing means for holding the sealing bellows 18 securely against the housing 10 can be dispensed with entirely, the production costs are additionally reduced.

In accordance with the provisions of the parent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A ball joint assembly adapted for use in a chassis steering arrangement comprising:
   a component having an opening, a first side and a second side;
   a ball joint having a housing in which a ball stud is arranged, said housing having a closed end, an opposite opened end and a weld section defined as an encircling flange extending from said housing, said component and said housing being formed from materials capable of being joined together by welding, said housing configured to be inserted into said opening of said component such that said weld section and said closed end of said housing are disposed adjacent said first side of said component, and said ball stud and said open end of said bellows extend through said opening to said second side of said component;
   a sealing bellows provided on an outside of said housing to provide a seal between said ball stud and said housing, said sealing bellows having a clamping section extending into said opening and clamped securely between said housing and an inner wall portion of said opening;
   an exposed weld seam formed between said weld section and said first side of said component when said housing is disposed adjacent said first side of said component and after said sealing bellows is provided on said outside of said housing and said clamping section is clamped securely on said housing; and
   a weld provided along said exposed weld seam to connect said component and said housing together and securely clamp said clamping section of said sealing bellows on said housing.

2. The ball joint assembly according to claim 1 wherein said weld section is provided with an encircling, conically tapering edge section.

3. The ball joint assembly according to claim 1 wherein said housing is constructed in one piece.

4. The ball joint assembly according to claim 1 wherein said clamping section abuts said weld section.

5. The ball joint assembly according to claim 1 wherein a portion of said sealing bellows is disposed between an outer surface of said housing and said opening to thereby provide a seal between said ball stud and said housing.

6. The ball joint assembly according to claim 1 wherein said ball joint defines a generally horizontal axis, said closed end is located radially in a first direction from said horizontal axis and said opened end is located radially in an opposite second direction from said horizontal axis, and said weld section extends generally axially outwardly from said housing and generally parallel to said horizontal axis and is located radially between said closed end and said opened end of said housing.

7. The ball joint assembly according to claim 1 wherein said housing is formed as a homogeneous one piece housing.

8. A ball joint assembly adapted for use in a chassis steering arrangement comprising:
   a component having an opening, a first side and a second side;
   a ball joint having a one-piece housing in which a ball stud is arranged, said housing having a closed end, an opposite opened end and a weld section defined as an encircling flange extending from said housing, said component and said housing being formed from materials capable of being joined together by welding, said housing configured to be inserted into said opening of said component such that said weld section and said closed end of said housing are disposed adjacent said first side of said component, and said ball stud and said open end of said bellows extend through said opening to said second side of said component;
   a sealing bellows provided on an outside of said housing to provide a seal between said ball stud and said housing, said sealing bellows having a clamping section extending into said opening and clamped securely between said housing and an inner wall portion of said opening, said clamping section abutting said weld section;
   an exposed weld seam formed between said weld section and said component when said housing is disposed adjacent said component and after said sealing bellows is provided on said outside of said housing and said clamping section is clamped securely on said housing; and
   a weld provided along said exposed weld seam to fuse the materials of said component and said housing with each other and securely clamp said clamping section of said sealing bellows on said housing.

9. The ball joint assembly according to claim 8 wherein said weld section is provided with an encircling, conically tapering edge section.

10. The ball joint assembly according to claim 8 wherein a portion of said sealing bellows is disposed between an outer surface of said housing and said opening to thereby provide a seal between said ball stud and said housing.

11. The ball joint assembly according to claim 8 wherein said ball joint defines a generally horizontal axis, said closed end is located radially in a first direction from said horizontal axis and said opened end is located radially in an opposite second direction from said horizontal axis, and said weld section extends generally axially outwardly from said housing and generally parallel to said horizontal axis and is located radially between said closed end and said opened end of said housing.

12. The ball assembly joint according to claim 8 wherein said housing is formed as a homogeneous one piece housing.

* * * * *

UNITED STATES PATENT AND TRADEMARK OFFICE
CERTIFICATE OF CORRECTION

| | | |
|---|---|---|
| PATENT NO. | : 7,367,743 B2 | |
| APPLICATION NO. | : 11/341903 | |
| DATED | : May 6, 2008 | |
| INVENTOR(S) | : Peter Bernhardt et al. | |

It is certified that error appears in the above-identified patent and that said Letters Patent is hereby corrected as shown below:

Column 4, Claim 8, Line 47, after the first occurrence of the word "said" insert --first side of said--.

Signed and Sealed this

Sixteenth Day of February, 2010

David J. Kappos
*Director of the United States Patent and Trademark Office*